United States Patent [19]

Fisher et al.

[11] Patent Number: 5,392,066
[45] Date of Patent: Feb. 21, 1995

[54] IN-STORE ADVERTISING SYSTEM

[75] Inventors: Daniel J. Fisher, Summerfield; Robert J. King, Temple Terrace, both of Fla.

[73] Assignee: Parker Communication Systems, Inc., Tampa, Fla.

[21] Appl. No.: 977,772

[22] Filed: Nov. 19, 1992

[51] Int. Cl.⁶ .............................................. H04N 7/04
[52] U.S. Cl. ........................................ 348/8; 348/473
[58] Field of Search ............... 186/35, 52; 358/93, 358/86, 85, 142; 455/3.2, 12.1; H04N 7/20; 340/825.49; 348/8, 9, 10, 24, 469, 473, 21, 722, 723

[56] References Cited

U.S. PATENT DOCUMENTS

| 4,695,880 | 9/1987 | Johnson et al. | 455/3.2 |
| 4,724,491 | 2/1988 | Lambert | 358/310 |
| 4,916,539 | 4/1990 | Galumbeck | 358/142 |
| 5,055,924 | 10/1991 | Skutta | 358/142 |

OTHER PUBLICATIONS

Philips Videofax Product Application Note–Network Systems for Finance Interactive Picture Systems, Inc., Apr. 1992.
AdVision Hits Cable Market Running–Five Sites Begin '92 Season Video Arts Systems & Technology, Inc., Feb. 10, 1992.
Videofax–Moving Up The Videofax Company, Jul., 1992.
NuMedia's Total Multimedia Solution NuMedia Corporation.
InfoChannel Scala, Inc.

Primary Examiner—Victor R. Kostak
Attorney, Agent, or Firm—Dominik, Stein, Saccocio, Reese, Colitz & Van Der Wall

[57] ABSTRACT

An in-store advertising system for displaying advertisements involves preparing graphical art from the actual products or from flat art, for each advertised product. Each frame is stored in computer memory as a digital graphics file. As desired, pricing and advertising copies are added as overlays to the digital art of each frame. Control data is defined for each frame indicating its destination location(s) and the run time for each destination location. The digital graphic files containing a digital frame and the respective control data for each frame are then loaded into an uplink control computer. The control data is analyzed by the uplink computer to compute an adlist which lists the digital frames and their respective destination locations. The uplink control computer is interfaced to a satellite addressable network control system (ANCS) to unmute the desired satellite receiver(s) at the remote location(s), based upon a predefined transmission script. The uplink computer then transmits the respective graphic files, control data and adlist via a satellite transmitter to a commercial broadcasting satellite. The remote receivers display the graphic data based on the code data.

10 Claims, 2 Drawing Sheets

IN-STORE ADVERTISING SYSTEM

BACKGROUND OF THE INVENTION

1. Field of the Invention

This invention relates to advertising systems in which retail advertisements are broadcast to a remote location for reception and display via a monitor for viewing by potential retail purchasers. More particularly, this invention relates to advertising systems in which the advertisements are broadcast and received by monitors positioned in retail stores for point-of-purchase viewing by the shoppers in the store.

2. Description of the Background Art

Presently, advertisements in the form of television commercials are viewed by potentially millions of television viewers. Therefore, television commercials have been an effective means for advertising retail products to potential purchasers. However, every year television viewers are exposed to more commercials and shorter commercials. As a result of this sensory overload, many viewers avoid commercials entirely by changing from one television channel to another via their hand-held television remote control. As this commercial clutter and television changing increases, the impact of each advertisement declines. Indeed, it is estimated that one-fifth of all television viewers pay no attention to television commercials. Additionally, until recently, daytime television was regarded as an efficient and affordable alternative to prime time television. However, daytime ratings have declined in the past ten years. Additionally, because of changing lifestyles, viewing among women has declined by one-third. Furthermore, because of a shift to independent stations, cable television, and video cassette recorders, commercial networks now reach only three-quarters of the available audience.

In view of the foregoing, several systems have been recently developed for displaying advertisements on television monitors positioned throughout a store. In-store advertising of this nature is particularly advantageous because the sight and action of television is combined with the impact of point-of-purchase to deliver a powerful and timely message in the retail store where buying decisions are being made.

For example, an advertising system known as InfoChannel produced by Scala, Inc., 1801 Robert Fulton Drive, Suite 400, Reston, Va. 22091 allows advertisement pages with text and illustrations to be transmitted from a control center to a network of television sets. InfoChannel can also connect several television networks located in different buildings by using computers and modems which permit the advertisements to be sent to the remote locations over standard telephone lines. Control software known as InfoNet permits different advertisements to be sent to different locations automatically. Finally, InfoChannel includes means for broadcasting the advertisements to remote locations by inserting the advertisement data into a television channel's free space in such a manner that the advertising data can be extracted from the television signal by the computers at each location. In this manner, broadcasts via satellite to thousands of locations can occur simultaneously.

Another advertising system known as AdVision produced by Video Arts Systems & Technology, Inc. of Sea Girt Village Center, 2175 Hwy. 35, #8-R, Sea Girt, N.J. 08750 delivers advertisements and electronic bulletin-board type presentations by means of a production workstation and a plurality of receiving player systems positioned at remote locations. The advertisements are transmitted from the production workstation to the receiving player systems at the remote locations over cable television.

Similar to InfoChannel, a system known as Videofax produced by The Videofax Company, 60 Madison Avenue, Suite 903, New York, N.Y. 10010 enables still video images to be transmitted across standard telephone networks or corporate data networks to remote receiver systems, which then display the video images.

Another advertising system known as NewMedia produced by NewMedia Corporation of 201 North Union Street, Alexandria, Va. 22314 employs satellites or modems and telephone lines, to transmit advertisements from a digital studio to remote locations for display by computer or television monitors. A communications manager controls the file server of the data television network with appropriate data compression, inscription, forward error correction, format conversion and addressing to increase reception reliability.

The above advertising systems have enjoyed various levels of commercial success. There have been several drawbacks. For example, the transmission of advertisements through the use of modems and telephone lines necessarily precludes the simultaneous transmission of the advertisements to the remote locations. Indeed, even when banks of modems are employed with a corresponding number of telephone lines, the transmissions for the most part must occur serially rather than concurrently. Additionally, because of the large data size of video images relative to maximum modem speeds, transmission via telephone lines take considerable amounts of time and are therefore very costly over the long term. In contrast, the advertising systems noted above that employ satellites, allow the advertisements to be transmitted to a group of remote locations by simultaneous broadcast. Furthermore, the bandwith of satellite transmitters and receivers are much greater than that of telephone lines and therefore the transmission time is substantially reduced. Hence, broadcasting via satellite is significantly less expensive over the long term even when the more expensive satellite equipment costs are amortized. Unfortunately, satellite broadcasting is a one-way system and therefore, although significantly reliable, there exists the possibility that a broadcast is not received or properly received, by one or more of the remote locations.

Finally, the above advertising systems which employ existing cable television networks are disadvantaged to the extent that usage fees must always be paid to the cable television company. Furthermore, since cable television is usually localized with respect to a city or a portion of the city, the advertisements must be transmitted to each of the cable television networks by modems and telephone lines or satellites, thereby having the drawbacks noted above.

It is an object of this invention to provide an improvement which overcomes the aforementioned inadequacies of the prior art systems and provides an improvement which is a significant contribution to the advancement of advertising systems.

SUMMARY OF THE INVENTION

For the purpose of summarizing this invention, this invention comprises an in-store advertising system for displaying advertisements in a retail store. More particularly, in the advertising system of this invention, graphical art for each advertised product is prepared by an art department from the actual products or from flat art. Each frame is stored in computer memory as a digital graphics file. As desired, pricing and advertising copy are added as overlays to the digital art of each frame. Control data is defined for each frame indicating its destination location(s) and the run time for each destination location. The digital graphic files containing a digital frame and the respective control data for each frame are then loaded into an uplink control computer. The control data is analyzed by the uplink control computer to compute an adlist which lists which the digital frames and their respective destination locations. The uplink control computer is interfaced to a satellite addressable network control system (ANCS) to unmute the desired satellite receiver(s) at the remote location(s), based upon a predefined transmission script. The uplink control computer then transmits the respective graphic files, control data and adlist via a satellite transmitter to a commercial broadcasting satellite.

At each remote location, the received broadcast from the satellite is then loaded to a graphics display computer. The graphics display computer analyzes the received adlist to verify that all digital frames, along with their respective control data, have been received without errors. If errors are detected, the graphics display computer automatically dials the uplink control computer via modem and telephone line and requests that the damaged or missing digital frame be retransmitted via the modem and telephone line, along with its respective control data. Once all of the digital frames with their respective control data have been received, the graphics display computer then sequentially displays the digital frames, based upon the control data, via a plurality of video monitors positioned throughout the remote location. However, if need be, the graphics display computer may begin sequentially displaying the digital frames while the damaged/missing digital frame is being acquired, thereby eliminating any dead time.

The advertising system of the invention enjoys the economy of satellite broadcasting and the reliability of direct connection of modems and telephone lines. Specifically, satellite broadcasting provides a economically efficient means for transmitting advertisements to a group of remote locations since all of such locations constituting the group receive the broadcast simultaneously. The adlist provides a means for each location to verify that all frames have been received. Furthermore, modems and telephone lines are employed only when a graphics file (or the adlist) has been corrupted and requires retransmission. In which case, only the corrupted file (or adlist) is retransmitted over the telephone line to the remote site, thereby minimizing long distance telephone charges.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
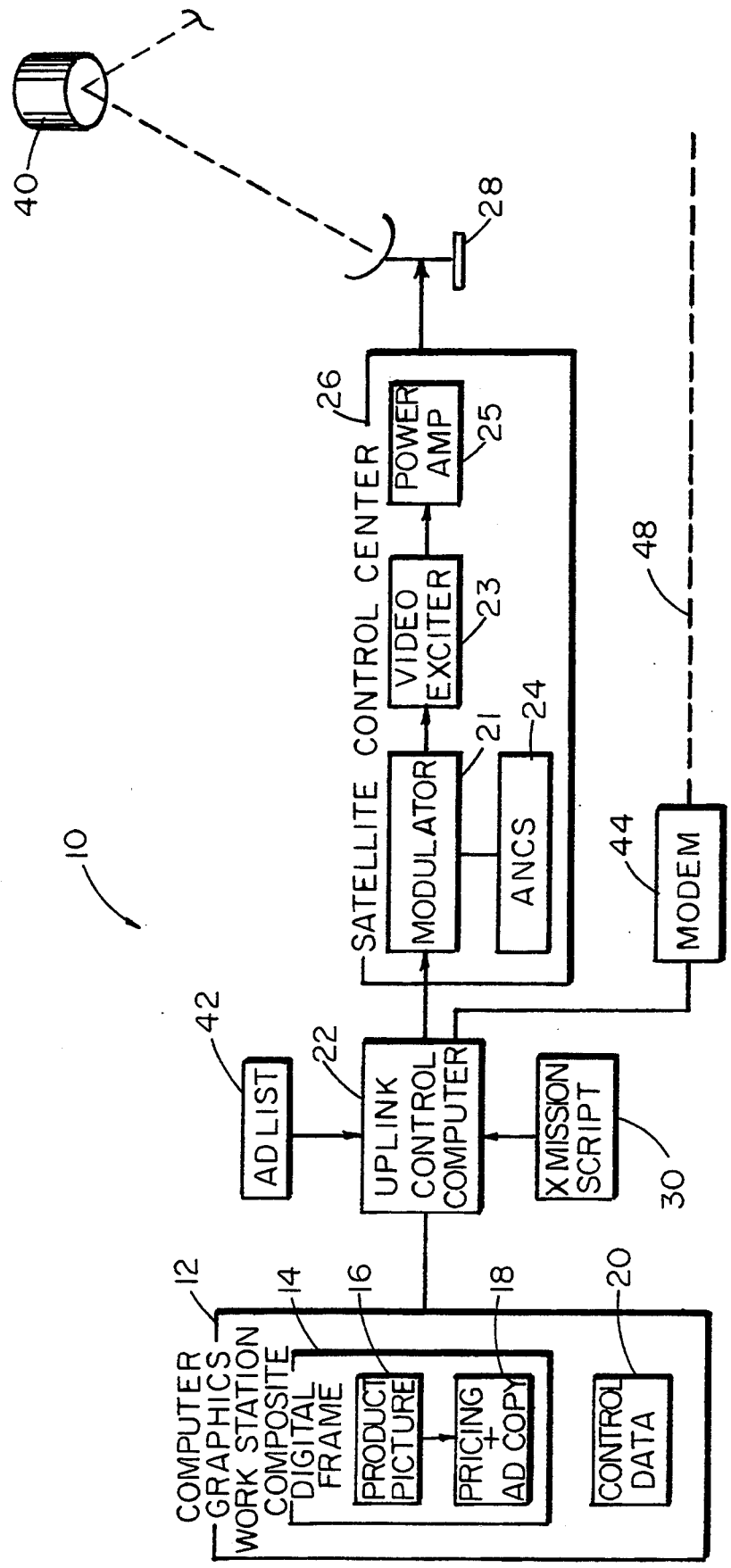
FIG. 1 is a diagrammatic view of the in-store advertising system of the invention illustrating the method by which advertisements are created and selectively satellite broadcasted to remote locations.
Figure 2:
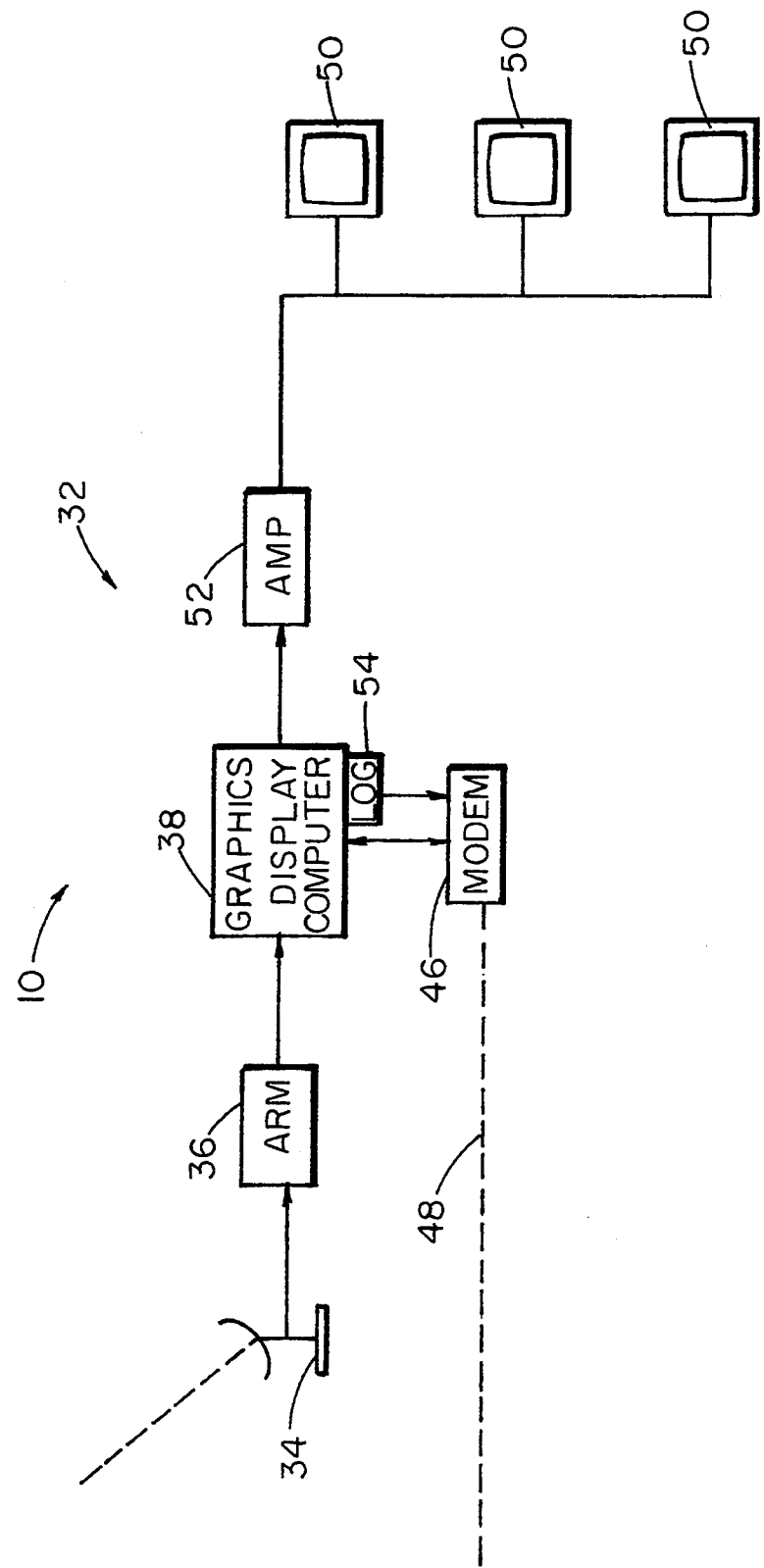
FIG. 2 is a diagrammatic view of the in-store advertising system of the invention illustrating the method by which the broadcasted advertisements are displayed within their respective locations.

Referring to FIGS. 1 and 2, the in-store advertising system 10 of the invention comprises a graphics computer work station 12 for producing composite digital frames 14 including a picture 16 of a product to be advertised and suitable overlays such as pricing and other advertising copy 18. The composite digital frames 14 are preferably stored in compressed format in the memory of the graphics computer work station 12. Control data 20 is defined for each composite digital frame 14 to indicate to which location(s) the frame 14 is to be sent and for each such location, the run time of such frame 14 and the order in which each frame 14 is run relative to the other frames 14 in that location.

The composite digital frames 14 along with the control data 20 are then supplied to an uplink control computer 22 and a satellite control center 26 including conventional addressable network controller system (ANCS) 24 having outputs which feed to a modulator 21. The modulator 21 converts the baseband signal into a radio frequency subcarrier. These subcarriers are then fed to a video exciter 23 where the signals are upconverted to the high frequency microwave signal to be transmitted. That signal is then fed to the input of the power amplifier 25 where the signal is increased in power to approximately 200 watts and fed to an antenna 28 for transmission to the satellite 40. Preferably, the ANCS comprises model no. ANCS manufactured by Wegener Communications, 11350 Technology Circle, Duluth, Ga. 30136, the modulator comprises model no. 2061, manufactured by Wegener Communications, the video exciter comprises model no. UEV-14-D3-LM manufactured by LNR Communications, 70 Suffolk Court, Haupaug, N.Y. 11788, and the power amplifier comprises model no. VZU 6993F33SR manufactured by Varian Microwave, 3200 Patrick Henry Drive, Santa Clara, Calif. 95054.

A transmission script 30 is created in the uplink control computer 22 to identify, based upon the control data 20, which frames 14 are to be broadcast to which group(s) of locations and to define a priority of broadcasts to the respective groups.

Each location, generally indicated by numeral 32, comprises a conventional satellite dish 34, connected to an addressable receiver module (ARM) 36 which is in turn connected to a graphics display computer 38. It is noted that the ARM 36 for each location 32 is selectively addressable by the ANCS 24 so that the satellite dishes 34 of each group of locations 32 may be simultaneously instructed to receive the respective broadcast via satellite 40 from the satellite control center 26 as defined by the transmission script 30.

In addition to the creation of the transmission script 30, an adlist 42 is created for each group of locations 32. The adlist 42 contains a listing of the frames 14 to be transmitted along with their respective control data 20. The adlist 42 for each group of locations 32 is transmitted along with the respective frames 14 and control data 20. Upon reception by each location 32, the graphics display computer 38 verifies that all of the frames 14 with their respective control data 20 were in fact received without errors. Therefore, it can be appreciated that the adlist 42 serves as a means for the graphics display computer 38 at each location 32 within a group to verify that it received all of the intended frames 14 and control data 20 for that location 14. Should the adlist 42 not be received by the graphics display computer 38, or should the graphics display computer 38 determine that one or more of the frames 14 and/or respective control data 20, were missing or corrupted during satellite broadcast, then the graphics display computer 38 automatically dials and connects itself to the uplink control computer 22 via respective modems 44 and 46 and telephone line 48 and requests the uplink computer 22 to transmit the missing or corrupted adlist 42 and/or the missing or corrupted frames 14 and control data 20 via the telephone line 48.

Once all of the frames 14 and their respective control data 20 and once the adlist 42, have been received by the graphics display computer 38 without error, the graphics display computer 38 then begins displaying the frames 14 in the desired sequence and at the desired run times as determined by the respective control data 20 via one or more monitors 50 positioned within the location 32. A distribution amplifier 52 may be provided to assure a strong video signal to the monitors 50.

While there exists many applications for the in-store advertising system 10 of the invention, one of the more dominant applications includes advertising within chains or groups of retail grocery stores. More specifically, a pair of monitors 50, positioned back-to-back, are preferably suspended from the ceiling and positioned within each aisle of the grocery store 32. Additional monitors may be positioned over the deli, fresh produce, and similar areas. All of the monitors 50 are connected to a graphics display computer 38 positioned within the store 32, and an ARM 36 and satellite dish 34 are installed for receiving satellite broadcasts.

Appropriate composite digital frames 14 comprising product pictures 16 and pricing and other advertising copy 18 are produced in the graphics computer workstation 12. Control data 20 is developed as desired to define which frames 14 are to be sent to which groups of stores 32. The frames 14 and the control data 20 are supplied to the uplink control computer 22 wherein an adlist 42 is created, based upon the control data 20, for each group of stores 32. A transmission script 30 is also created to define the order of broadcasts to each group of stores 32. The uplink control computer 22 interfaced with ANCS 24 instructs the satellite dishes 34 and ARMs 36 of each group of the stores 32 to be unmuted, whereupon the frames 14 and control data 20 are broadcast according to the transmission script 30 to the respective groups of stores 32. This process is serially repeated until such time as all of the groups of stores 32 receive their respective broadcasts. Should any specific store 32 fail to receive the adlist 42 and or any particular frame 14 with the control data 20, the graphics display computer 38 in such store 32 may connect itself via modems 44 and 46 and telephone line 48 to the uplink control computer 22, whereupon the missing adlist 42 and or frames 14 may be sent over the telephone line.

Once the graphics display computer 38 in each store 32 has verified its reception of the frames 14 and control data 20, the graphics display computer 38 then begins to display the frames 14 in accordance with the control data 20, via the monitors 50.

It is noted that the frames 14 are preferably run continuously in each store 32 according to their respective control data 20. It is also noted that each frame 14 may be displayed with a variety of screen show effects or wipes such as exploding box, a checkerboard, zigzag, horizontal split, vertical split, so as to more readily gain the attention of the shopper. It is also noted that the frames 14 may be designed so that when they are rapidly sequenced, the frames 14 appear to be animated. Finally, it is noted that the graphics display computer 38 preferably includes means for maintaining a log 54 of the time and duration each frame 14 is displayed and then periodically sending such log 54 to the uplink control computer 22 via modems 44 and 46 and telephone line 48. In this manner, the data contained in log 54 can be used as a basis for billing the respective advertisers of the products thereby generating a source of advertising revenue.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. An advertising system for advertising products at grouped locations, comprising in combination:

a plurality of digital images including advertising of at least one of the products;

control data associated with said images to identify the group of locations at which each said image is to be displayed;

means for satellite broadcasting said images to the respective grouped locations at which said images are to be displayed; and, positioned in each location, antenna means for receiving the respective satellite broadcast of the respective said images and display means for displaying said images in said location, said antenna means including means for addressing all of said antenna means in each grouped location to receive the satellite broadcasting of the respective said images intended for that grouped location.

2. The advertising system as set forth in claim 1, wherein said means for satellite broadcasting said images to the respective group locations at which said images are to be displayed further comprises means for sequencing the satellite broadcasts.

3. The advertising system as set forth in claim 1, wherein said control data further identifies the sequence in which said images are to be displayed at each group location and wherein said means for satellite broadcasting said images to the respective group locations at which said images are to be displayed further comprises means for satellite broadcasting said control data to the respective group locations at which the respective said images are to be displayed in the indicated sequence.

4. The advertising system as set forth in claim 1, wherein said means for satellite broadcasting said images to the respective group locations at which said images are to be displayed further comprises means for satellite broadcasting a list of said images to their respective group locations at which the said images are to be displayed and wherein said antenna means for receiving the respective satellite broadcast of the respective said images comprises means for receiving the respective satellite broadcast of the list to verify that all of said images have been received.

5. The advertising system as set forth in claim 4, wherein said means for satellite broadcasting further comprises modem means and wherein said antenna means for receiving the respective satellite broadcast of the respective said images comprises modem means, whereby a missing or corrupted said image may be sent over a telephone line from said satellite broadcasting means to said antenna means.

6. A method for advertising products at grouped locations, comprising the steps of:
creating a plurality of digital images including advertising of at least one of the products;
identifying the group of locations at which each said image is to be displayed;
satellite broadcasting said images to the respective grouped locations at which said images are to be displayed; and,
at each location, receiving the respective satellite broadcast of the respective said images and displaying said images in said location, including addressing all of said antenna means in each grouped location to receive the satellite broadcasting of the respective said images intended for that grouped location.

7. The advertising method as set forth in claim 6, wherein the step of satellite broadcasting said images to the respective group locations at which said images are to be displayed further comprises sequencing the satellite broadcasts.

8. The advertising method as set forth in claim 6, further including the step of identifying the sequence in which said images are to be displayed at each group location and wherein the step of satellite broadcasting said images to the respective group locations at which said images are to be displayed further comprises satellite broadcasting said sequence identification to the respective group locations at which the respective said images are to be displayed in the indicated sequence.

9. The advertising method as set forth in claim 6, wherein the step of satellite broadcasting said images to the respective group locations at which said images are to be displayed further comprises the step of satellite broadcasting a list of said images to their respective group locations at which the said images are to be displayed and wherein the step of receiving the respective satellite broadcast of the respective said images comprises the step of receiving the respective satellite broadcast of the list to verify that all of said images have been received.

10. The advertising method as set forth in claim 9, further comprises the step of receiving a replacement of a missing or corrupted said image over a telephone line.

* * * * *